Figure 1:
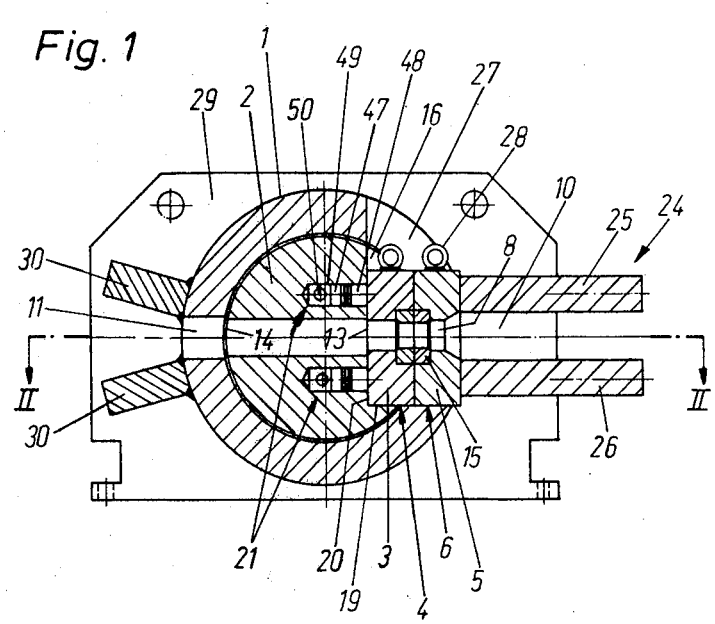

United States Patent [19]

Fuchs

[11] 4,128,027

[45] Dec. 5, 1978

[54] SHEARING DEVICES

[75] Inventor: Ernst E. Fuchs, Schmerikon, Switzerland

[73] Assignee: Mecafina S.A., Switzerland

[21] Appl. No.: 817,128

[22] Filed: Jul. 20, 1977

[30] Foreign Application Priority Data

Jul. 23, 1976 [CH] Switzerland .......................... 9494/76
Jul. 4, 1977 [CH] Switzerland .......................... 8177/77

[51] Int. Cl.² ........................... B26D 1/06; B26D 3/16
[52] U.S. Cl. ......................................... 83/198; 83/582; 83/639
[58] Field of Search .................. 83/198, 580, 582, 583

[56] References Cited

U.S. PATENT DOCUMENTS

| 3,089,368 | 5/1963 | Cousino | 83/198 X |
| 3,623,388 | 11/1971 | Göttling et al. | 83/582 |
| 3,624,720 | 11/1971 | Laky | 83/198 |
| 3,972,257 | 8/1976 | Lazar, Jr. | 83/198 |

Primary Examiner—Willie G. Abercrombie

[57] ABSTRACT

The invention relates to a shear for cutting-off sections of a profile material of the type having a stationary shear beam held in a housing and a movable shear beam which is arranged on a slide which is guided in the housing and can be displaced by means of a drive mechanism, each of the shear beams exhibiting at least one shear opening which is attached to the profile of the profile to be severed and with which are aligned inlet and outlet openings in the slide and housing for the profile material. Means in the housing define a recess in which is mounted the stationary shear beam and means in the slide define a recess in which is mounted the movable shear beam. The shear beams are arranged side by side in parallel and are removable from their respective recesses and, at least during severance of the profile material are biased by a biasing means together in a direction transverse to the direction of motion of the slide.

11 Claims, 7 Drawing Figures

SHEARING DEVICES

The invention refers to a shear for the chipless severance of sections of profiled material, having a stationary shear beam held in a housing and a movable shear beam which is arranged on a slide which is guided in the housing and can be displaced by means of a drive, each of the shear beams exhibiting at least one shear opening which is matched to the profile of the profiled material to be severed and with which are aligned inlet and outlet openings for the profiled material, which exist in the housing and in the slide.

An already known shear of this kind has a cylindrical housing arranged vertically and a slide arranged to be movable in it. An insert with a semicircular cross-section is fixed in the housing and the slide likewise has a semicircular cross-section so that with the insert it completes a cylindrical shape which fills the housing. The relative motion between the slide and the insert consequently takes place along the plane of symmetry which runs through the centre of the housing and along which a cutter insert let into the insert and a cutter insert let into the slide respectively, of particularly hard material, move relative to one another in order to cut off sections of the profiled material. The known shear has various disadvantages which amongst others consist in the fact that exchange of the cutter inserts is possible only by completely dismantling the shear, that further the housing and the slide must be manufactured to very close production tolerances if a satisfactory cut is to be achieved by cutter inserts lying hard up against one another. Since the contact pressure of the cutter inserts which are exchangeable only with great difficulty is not adjustable, with the heavy wear to which the parts are subjected, even with very accurate manufacture of the parts close contact of the cutter inserts with one another after some time is already no longer guaranteed, which in turn results in a cut which is not clean. Moreover with the slide arranged vertically a large amount of lifting work must be performed by a piston which is bigger in diameter than the housing, which assumes a correspondingly higher power of the hydraulic installation.

The object of the invention therefore consists in developing a shear of the kind referred to initially, in which the shear beams are provided with a number of shear openings for simultaneous severing of a number of sections of profiled material from profiled material fed in parallel and may be easily exchanged and above all the contact pressure is adjustable so that long working lives of the cutter inserts and high cutting efficiencies are achieved and where again cutting can be performed in one direction or in the other.

With a shear of the kind referred to initially this is achieved in accordance with the invention if the stationary shear beam in a recess formed in the wall of the housing and the movable shear beam in a recess formed at one side of the slide guided in the housing are arranged side by side in parallel and exchangeably and that the shear beams at least during the severance process are by a contact pressure device forced together transversely to the direction of motion.

Because of the available contact pressure device for pressing the shear beams together at least during the severing process clean cuts can be achieved with long working lives of the cutting inserts. The wear of the parts moved against one another is considerably less and with the availability of the contact pressure device no such close production tolerances have to be maintained in order to achieve satisfactory cuts. If moreover the shear beams are pressed together only during the severing process lower driving forces result for the return stroke and wear can thereby again be reduced. With the shear beams inserted in the recesses in the housing and the slide without a close fit the exchange of them is very much simplified, so that the shear can also be quickly changed over for processing profiled material of different shapes.

The contact pressure device for pressing the two shear beams together may preferably be arranged in the slide in order to press the movable shear beam against the fixed shear beam. This contact pressure device advantageously consists of contact pressure members arranged above and below the opening in the slide which lines up with the shear opening in the shear beam. These contact pressure members are preferably pneumatically or hydraulically actuated contact pressure pistons arranged in cylindrical bores. But the contact pressure members may also be prestressed springs.

The housing of the shear is advantageously made as a cylinder arranged horizontally and the slide as a cylindrical body guided in the cylinder, in which case there is further arranged in front of the recess in the cylinder in which recess the stationary shear beam is arranged, a yoke which is anchored at both sides of the recess and bridges over the recess and against which the stationary shear beam bears. Both the shear beams advantageously have a number of shear openings arranged at intervals one behind the other in the direction of motion of the slide. Several cuts can thereby be performed at the same time.

Various possibilities are conceivable for the drive of the shear such, for example, as a mechanical eccentric or a crank drive, but it is particularly advantageous if the shear exhibits a hydraulic driving mechanism with at least one piston/cylinder unit connected to the housing. In that case a piston rod of this piston/cylinder unit can cooperate with the slide. But particularly advantageous is a refinement in which the end region of the slide on both sides is made as a piston and the housing at the ends is made as a cylinder. In this refinement the piston/cylinder unit for the motion of the slide may be connected in communication with the device for pressing the movable shear beam into contact with the stationary shear beam. This takes place in such a way that the slide exhibits connection channels which connect the cylinder volume of the contact pressure piston with the cylinder volume of the slide made as a piston, that is, on the side from which the working stroke is effected, so that the contact pressure pistons participate in the pressure distribution of the hydraulic drive of the slide and develop their highest contact pressure power when the peak loading occurs during the severance process. In that way a special control device for the contact pressure pistons becomes superfluous.

Since for the severance process a large force is necessary during only a very short time, a hydraulic driving mechanism may advantageously be brought into use, which exhibits at least one pump coupled to a motor as well as a flywheel mass used as a store of energy for the peak loading during the cut. A less powerful motor may then be chosen than would be necessary because of the peak loading during the cut without such flywheel mass.

The shear in the refinement described above enables very high cutting efficiencies but it still has one disadvantage if in the case of the severed sections of profiled material particular requirements are imposed as to accuracy to gauge. That is, the large forces arising at the severance process lead in the case of the severed sections of profiled material to deformation of the cross-section with the result that this cross-section after the severance process no longer has the original dimensions but exhibits an oversize in the one direction. This oversize as well as the brow arising in the severance process at the edge of the face of separation, i.e., a thrown up ridge, are very disadvantageous if the severed section of profiled material is, for example, to be clamped in an automatic chuck during further treatment. To enable that, the severed sections must exhibit a constant accuracy to gauge.

It has now been found that severed sections of profiled material are obtained with only immaterial or no alteration of the shape of cross-section if the moving shear beam only starts to cut the profiled material from the one side and the final severance is then effected from the opposite side. In order to be able to perform such a procedure the slide with the movable shear beam must be able to be moved from a central position in opposite directions and after each severance process be positioned in this central starting position so that the profiled material can be introduced into the shear openings which line up in the starting position.

A preferred further development of the shear is therefore characterized in that the slide which can be moved by means of a pressure medium in the one direction of motion for starting to cut the profiled material and in the opposite direction of motion for the severance of the profiled material is held in the starting position with shear openings in the two shear beams in line for introduction of the profiled material, between two positioning stops which are arranged movably on sides of the housing lying opposite one another and are forced into an end position under the action of spring means, and which after each severance process bring the slide back into the starting position under the action of the spring means.

In a preferred refinement each of the positioning stops consists of a piston rod resting against the end of the slide by its endface and of a piston which is connected to the piston rod and guided in a cylinder and which in its end position rests against the end of the cylinder next to the slide and thereby positions the slide in the starting position. In a preferred refinement the piston is acted upon by a pressure medium which is subject to the pressure of a gas storage. Hence the pressure medium and gas storage form the spring means which bring the slide back after each severance process into the starting position, since during the severance process by the motion of the slide and of the piston of the positioning stop a pressure gets built up in the gas storage, which after the severance process moves the piston back as far as the end position. The spring means acting on the piston of the positioning stop could also consist of a compression spring acting against the piston.

Figure 2:
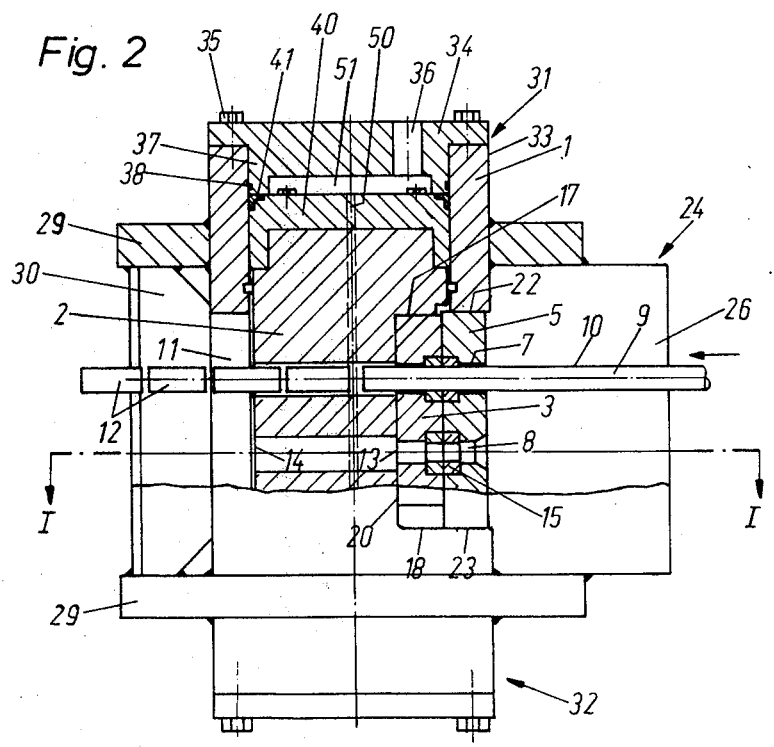
Figure 3:
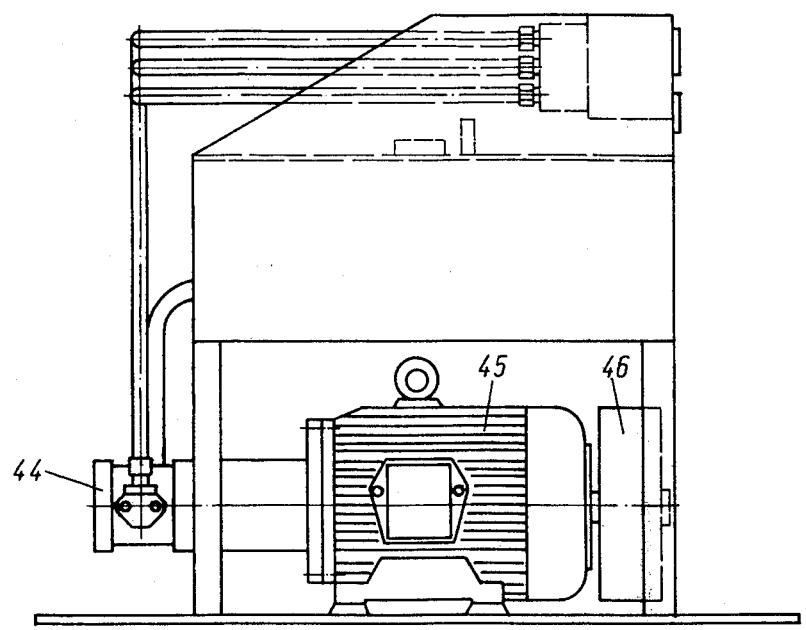
Figure 4:
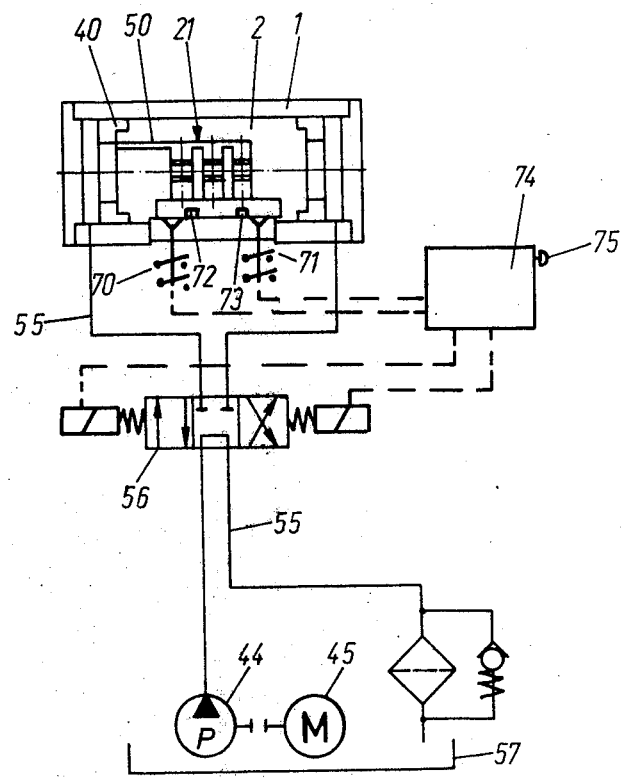
Figure 5:
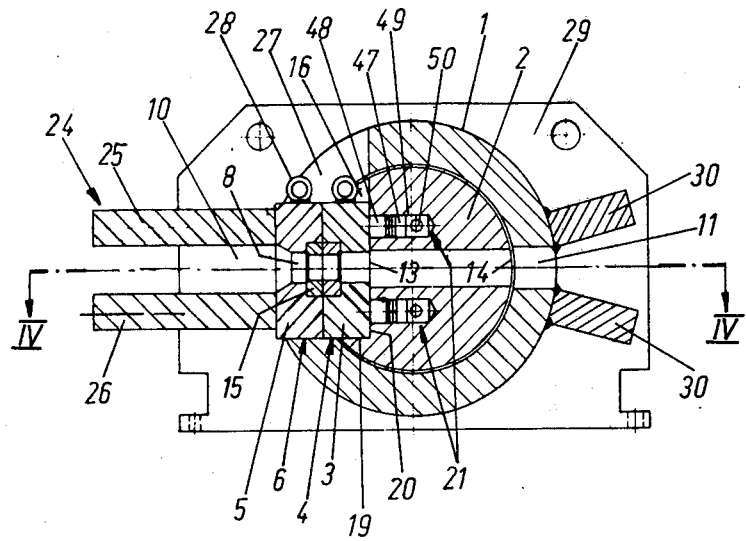
Figure 6:
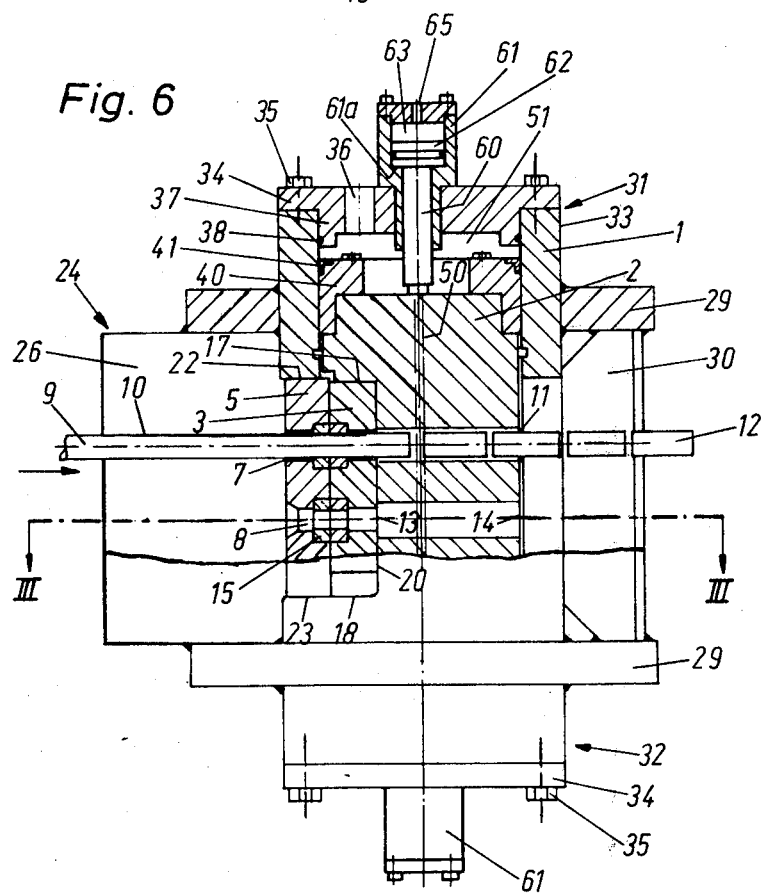
Figure 7:
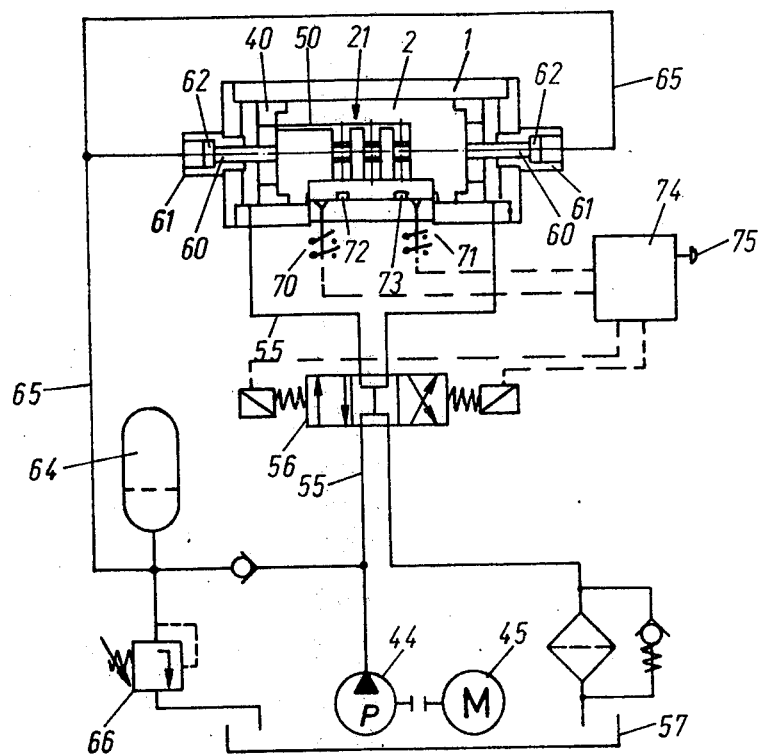

Further particulars and advantages of the invention appear from the following description and the drawings in which different embodiments of the shear are illustrated purely by way of example. There is shown in:

FIG. 1 — a cross-section through the shear along the line I—I in FIG. 2;

FIG. 2 — the shear partly in plan from above and partly in longitudinal section along the line II—II in FIG. 1;

FIG. 3 — one part of the hydraulic driving mechanism for the shear in accordance with FIGS. 1 and 2 in side elevation;

FIG. 4 — a diagrammatic illustration of the shear and the hydraulic drive;

FIG. 5 — a cross-section through a modified embodiment of the shear along the line III—III in FIG. 6;

FIG. 6 — the modified embodiment of the shear partly in plan from above and partly in longitudinal section along the line IV—IV in FIG. 5;

FIG. 7 — a diagrammatic illustration of the modified embodiment of the shear and the hydraulic driving mechanism.

The shear illustrated in FIGS. 1 and 2 exhibits a tube-like housing 1 made in the shape of a cylinder barrel in which a slide 2 which is made cylindrical is arranged to be displaceable longitudinally. A movable shear beam 3 is arranged in a recess 4 in the slide 2 and cooperates with a stationary shear beam 5 which is supported in a corresponding recess 6 in the housing 1. The shear beams contain one or more, in the example shown, two, shear openings 7, 8 which are matched to the profile of the profiled material 9 to be severed. The housing contains an inlet opening 10 through which the profiled material 9 to be severed gets fed to the shear beams 3, 5, and an outlet opening 11 from which the severed sections 12 of the profiled material 9 can emerge. The slide 2 contains an inlet opening 13 too, in front of which lies the displaceable shear beam 3, and an outlet opening 14 which lines up with the outlet opening 11 in the housing 1. The shear is equipped with a hydraulic driving mechanism which is described again in greater detail below.

The shear beams 3, 5 exhibit a rectangular cross-section and contain in the shear openings 7, 8 on the sides facing one another cutter inserts 15 of high-strength material. These cutter inserts may consist, for example, of hard metal, sintered metal or if the occasion arises, ceramic material. The movable shear beam 3 lies freely in the slide 2 in the recess 4 which extends in the direction longitudinal to the slide and tangentially to it and exhibits an opening 16 lying at the top. The shear beam 3 in the direction longitudinal to the slide 2 bears against bearing surfaces 17, 18 and rests on a seat 19. On the side remote from the stationary shear beam 5 the movable shear beam 3 rests against a bearing surface 20 and cooperates with a contact pressure device 21 described in greater detail below, which during the cut presses the movable shear beam 3 against the fixed shear beam 5.

The fixed shear beam 5 lies freely in the recess 6 in the housing 1 and in the longitudinal direction bears against the bearing surfaces 22, 23. On the side remote from the movable shear beam a yoke 24 serves to support the fixed shear beam, being made in two parts of which a first part-yoke 25 is arranged above the shear openings 7, 8 in the shear beam 5 and a second part-yoke 26 below, so that the two part-yokes bound a slot which acts as an inlet opening 10. The recess 6 in the housing 1 has an opening 27 lying at the top, which extends sideways up to and over the movable shear beam 3. The shear beams 3, 5 have eyes 28 by which they can be taken by hand or by means of a hoist out of the recesses 4, 6. By that means shear beams which have become unusable can quickly be exchanged or shear beams exchanged for ones with other profiles to the shear openings.

The housing 1 exhibits two supports 29 and on the outlet side at both sides of the outlet opening 11 is reinforced by means of ribs 30.

As appears from FIG. 2 and FIG. 4 the shear is equipped with a hydraulic driving mechanism. For this purpose the ends of the housing 1 and the slide 2 are formed as piston/cylinder units 31 and 32 respectively. That means that for each of these piston/cylinder units 31 or 32 one end region of the housing 1 is formed as a cylinder 33 and the end of the slide 2 is formed as a piston 40. The end of the housing formed as the cylinder 33 is closed by a cover 34 which is fastened to the end of the housing by means of bolts 35. In the cover 34 a connection opening 36 is provided for hydraulic oil. For sealing to the housing the inner flange 37 of the cover 34 carries a seal 38.

The hydraulic driving mechanism contains as appears from FIGS. 3 and 4 at least one pump 44 which is driven by a motor 45. A flywheel mass 46 serves as energy storage for the peak loading during the cut.

In this way it is possible to choose a less powerful motor than would be necessary for the peak loading during the cut. In the lead system 55 between the pump 44 and the piston/cylinder unit 31 or 32 at the ends of the shear a directional control valve 56 is arranged, which by switching over directs the oil flow respectively to the right or left side of the shear. The oil coming from the shear also flows via this directional control valve 56 back to the oil tank 57.

For pressing the movable shear beam 3 against the stationary shear beam 5 a contact pressure device is used, designated in FIG. 1 in a general way by 21. Contact pressure pistons 47 which slide in cylindrical bores 48 are provided in the slide 2 above and below the shear openings 7 and 8, arranged with their axis transverse to the direction of displacement of the shear beam 3, and act against the side of the movable shear beam 3, remote from the stationary shear beam. The cylinder volumes 49 of the contact pressure device are connected via connection channels 50 to the cylinder volume 51 of the piston/cylinder unit 31. The connection channels 50 and the contact pressure pistons are preferably so designed that the force of contact pressure amounts to about 20% to 25% of the cutting force. This formation of the contact pressure device has the advantage that the force of contact pressure is directly dependent upon the cutting force and is highest when the peak loading occurs during the cut. During the return motion of the slide there is practically no contact pressure. In that way not only is the motion of the slide during the return motion facilitated, but also the wear on the shear beams is reduced. In FIGS. 5 to 7 a modified embodiment of the shear is illustrated by which sections of profiled material may be severed without the severed section experiencing any essential alteration in its cross-section. For this purpose the shear is only to start to cut the profiled material during the motion of the shear beam in the one direction and only during the motion of the shear beam in the opposite direction finally sever the profiled material. For this procedure the slide must be positioned in a central position which permits motions in both directions, this central position being the starting position of the slide in which the shear openings in the two shear beams are in line with one another in order to be able to introduce the profiled material, and after each severance process the slide must be brought back again into this starting position. For this purpose the slide 2 is held in the starting position between two positioning stops arranged movably on opposite sides of the housing 1 and forced into one end position under the action of spring means. Each positioning stop consists of a piston rod 60 resting against the endface of the slide 2 and of a piston 62 which is connected to the piston rod and guided in a cylinder 61, and which in its end positon rests against the end 61a of the cylinder next to the slide. When the pistons 62 on both opposite sides of the housing are in this end position the slide 2 is positioned in the starting position.

The cylinder 61 is mounted in the cover 34 at the end of the housing. The piston 62 is under pressure from hydraulic oil 63 which is under pressure from a gas storage 64 (FIG. 7), to which both of the cylinders 61 at the two ends of the housing 1 are connected via leads 65. When during service of the shear one or other piston 62 gets moved away from the end position at the end 61a of the cylinder, hydraulic oil displaced by the piston arrives at the gas storage 64 the counterpressure of which is thereby increased. Hence the hydraulic oil and the gas storage act as spring means for the movement of the two positioning stops into the end position after each working cycle of the shear. But it would also be possible to arrange compression springs which act against the positioning stops. It appears from the diagram in accordance with FIG. 7 that the gas storage 64 with the connecting leads 65 to the cylinders 61 is advantageously connected to the lead system for the hydraulic drive of the slide 2 and the pump 44 necessary therefor. The pressure prevailing in the lead 65 connecting the cylinders 61 to the gas storage 64 may be set by a pressure limiting valve 66.

In the case of this modified embodiment of the shear the to-and-fro motion of the slide 2 from the starting position is controlled by limit switches 70 and 71 shown in FIG. 7, which are arranged in the region of the shear beams and are actuated by cams 72 and 73 arranged on the movable shear beam.

The limit switches are electrically connected via an electrical controlbox 74 to the electromagnetically actuated directional control valve 56. The controlbox contains control elements by which upon actuating the closing pushbutton 75 the shear is put into service for the first motion of the slide for starting to cut the profiled material and by which further upon actuation of the first limit switch the directional control valve get switched over from the first position into the second, whereupon the slide gets moved in the opposite direction in order to sever the profiled material, which motion of the slide upon encountering the second limit switch is stopped. The directional control valve thereupon returns automatically under spring action into the zero position.

I claim:

1. A shear for severing sections of a profiled material comprising a cylindrical housing disposed horizontally and having it its wall a recess, a stationary shear beam removably mounted in said recess, a yoke on said housing mounted on both sides of said recess and bridging said recess, said stationary shear beam bearing against said yoke, a cylindrical body in said cylindrical housing, said cylindrical body having on one side a recess, a movable shear beam being removably mounted in said recess, each of said shear beams having at least one shear opening, said opening having a profile adapted to that of said material to be severed, said cylindrical housing and said cylindrical body having inlet and outlet openings for said material in alignment with the shear opening in the respective shear beam, a plurality of pressure pistons arranged in cylindrical bores inside said cylindrical body and disposed above and below said openings in said cylindrical body for biasing the movable shear beam and the stationary shear beam towards one another transverse to the direction of motion of said cylindrical body, at least during severance of said profiled material, said cylindrical body being movable in said housing by a hydraulic driving mechanism, said housing being in communication with said bores provided with said pressure pistons.

2. A shear according to claim 1 wherein each of said shear beams includes a plurality of shear openings arranged one behind another in the direction of motion of said cylindrical body.

3. A shear according to claim 1, wherein said cylindrical body defines a piston of a piston cylinder unit and said housing defines said cylinder of said piston cylinder unit enclosing said piston.

4. A shear according to claim 1, wherein said hydraulic driving mechanism further comprises at least one pump; a motor driving said pump; and a flywheel mass driven by said motor for storing energy for said peak loading of said shear during severance of said profile.

5. A shear according to claim 1, wherein said shear openings comprise cutter inserts of hard material.

6. In a shear for cutting-off sections of a profiled material, the shear having a stationary shear beam and a movable shear beam, said stationary shear beam being held in a housing, a cylindrical body guided in said housing and movable therein, said movable shear beam being mounted on said cylindrical body, each of said shear beams including means defining at least one shear opening, said opening having a profile adapted to that of said material to be severed, said housing and said cylindrical body defining inlet and outlet openings for said material, said shear opening being adapted for alignment with said inlet and outlet openings; the improvement comprising means in said housing defining a recess, said stationary shear beam being removably mounted in said recess, means on said cylindrical body defining a recess, said movable shear beam being removably mounted in said cylindrical body recess, said stationary and said movable shear beam being mounted side by side in parallel, means for biasing said shear beams relatively towards one another, transverse to the relative direction of motion of said shear beams, at least during severance of said material, means for moving said cylindrical body in a first direction for starting to cut said material and in the opposite direction to complete cutting of said material, a plurality of positioning stops movably mounted on said housing opposite one another, means biasing said stops against said cylindrical body whereby said cylindrical body is biased to a starting position after each severing process in which said shear openings in said shear beams are aligned for the introduction of said material through said inlet opening in said housing.

7. A shear according to claim 6, wherein each of said stops comprises a piston rod bearing against an end of said cylindrical body; a piston connecting with said piston rod; a cylinder containing said piston, said piston bearing against an end of said cylinder proximate said cylindrical body when said cylindrical body is in said starting position.

8. A shear according to claim 7, further comprising means for supplying a pressure medium within said cylinder acting on said piston, said means comprising a gas storage device generating said pressure, said gas storage device being actuated by said pressure medium displaced by said piston during motion of said cylindrical body.

9. A shear according to claim 6, wherein said spring means acting on said piston of said positioning stop comprising a compression spring arranged between said piston and said cylinder end wall.

10. A shear according to claim 6, wherein movement of said cylindrical body is controlled by limit switches, said limit switches being actuated by movement of said cylindrical body and being electrically connect with a directional control valve, said directional control valve selectively changing said pressure medium between said opposite ends of said cylindrical body.

11. A shear for severing sections of elongated material comprising a housing, a stationary shear beam in said housing, a cylindrical body movable in said housing, a movable shear beam mounted on said cylindrical body, each of said shear beams having a shear opening with a cross-sectional configuration corresponding to that of the material to be severed, said housing and said cylindrical body having inlet and outlet openings for said material, means for moving said cylindrical body in a first direction for starting to sever said material and in the opposite direction to complete severing of said material, a plurality of positioning stops movably mounted on said housing on opposite sides of said cylindrical body, and means biasing said stops against said cylindrical body, whereby said cylindrical body is biased after each severing operation to a starting position in which said shear openings in said shear beams are aligned for the introduction of said elongated material through said inlet opening in said housing.

* * * * *